United States Patent [19]

Britton et al.

[11] 4,110,814

[45] Aug. 29, 1978

[54] WATTHOUR METER ENCLOSURE FOR USE IN REMOTE METER READING PACKAGES

[75] Inventors: James S. Britton, Raleigh; David W. Morgan, Zebulon, both of N.C.

[73] Assignee: Westinghouse Electric Corp., Pittsburgh, Pa.

[21] Appl. No.: 755,375

[22] Filed: Dec. 29, 1976

[51] Int. Cl.² ............................................. H02B 9/00
[52] U.S. Cl. .................................... 361/371; 361/372; 324/110; 324/156
[58] Field of Search ..................... 340/201 P; 324/110, 324/156; 361/364, 366, 371, 369, 372

[56] References Cited

U.S. PATENT DOCUMENTS

| | | | |
|---|---|---|---|
| 2,773,388 | 12/1956 | Prosser | 324/156 |
| 2,822,724 | 2/1958 | Uffner | 324/156 |
| 3,846,677 | 11/1974 | Keever | 361/364 |
| 3,943,441 | 3/1976 | Shackford | 324/110 |

*Primary Examiner*—Gerald P. Tolin
*Attorney, Agent, or Firm*—R. W. Smith

[57] ABSTRACT

An enclosure for watthour meters includes a cover having an opening for connecting a meter data sending unit within the enclosure to an adjacent remote meter reading terminal unit. A cover locking rim has locking tabs for securing the cover to a meter base assembly so that the cover is rotatably positionable relative to the base. The rotated positions of the cover opening permit different orientations of a remote meter reading package at a fixed meter mounting position.

6 Claims, 8 Drawing Figures

WATTHOUR METER ENCLOSURE FOR USE IN REMOTE METER READING PACKAGES

BACKGROUND OF THE INVENTION

This invention relates to watthour meter enclosures for use in remote meter reading packages, and more particularly to a watthour meter cover having an opening for connecting a meter equipped with a meter data sending unit to a remote meter reading terminal unit wherein the cover is positionable at different rotated positions to orient the remote meter reading package in a desired orientation.

In remote electric power meter reading systems the disc rotations or dial register readings of a watthour meter are translated by a meter data sending unit into electrical signals for recording or transmission of the meter readings. Watthour meters equipped with a meter data sending unit are usually associated with a terminal unit and can form an integral package therewith for installation at a watthour meter socket location. One means of making connection to the meter data sending unit is through an opening in the meter cover as described in U.S. Pat. No. 3,943,498. In the aforementioned patent, a pulse initiator forms a meter data sending unit mounted within the meter and connected through the opening in the cover to a recorder unit. The recorder and meter with the sending unit are packaged in a single housing. A load research device is formed by the apparatus described in the aforementioned patent and one such housing is described in detail in U.S. Pat. No. 4,063,661 issued Dec. 20, 1977, and assigned to the assignee of this invention. The load research enclosure of the aforementioned application is mountable directly on the meter cover in different rotated positions about the cover to provide mounting of the enclosure in different positions around the cover.

Typically, watthour meters are detachably mounted at existing meter sockets so that the associated detachable meter base and meter movement have a fixed position. An opening in a cup-shaped meter cover receives a connector or cable conductors connected to the meter data sending unit with the opening normally having the same location when the cover is affixed to the meter base. Obstructions are often adjacent the meter making it difficult to assemble a remote meter reading package in a fixed relationship to a meter location. Accordingly, the present invention overcomes the limitations of a watthour meter cover which has a fixed position on the meter base when used in remote meter reading packages where obstructions are adjacent the fixed location of a watthour meter.

SUMMARY OF THE INVENTION

In accordance with the present invention, a watthour meter enclosure for a remote meter reading package includes a cover having a side opening which is rotationally positionable. A locking rim of the cover has L-shaped locking tabs for attaching the cover to the meter base so that the cover is rotational after it is mounted to the meter base. The cover is rotatable on the base and a rotational lock arrangement maintains the cover affixed to the meter base in a predetermined rotated position. A remote meter reading terminal unit is mounted to the cover at the side opening by a coupling assembly. A meter data sending unit is supported within the watthour meter enclosure and is connected to the terminal unit by wire conductors passing through the cover opening and a conduit part of the coupling assembly.

DETAILED DESCRIPTION OF THE PREFERRED EMBODIMENT

Figure 1:
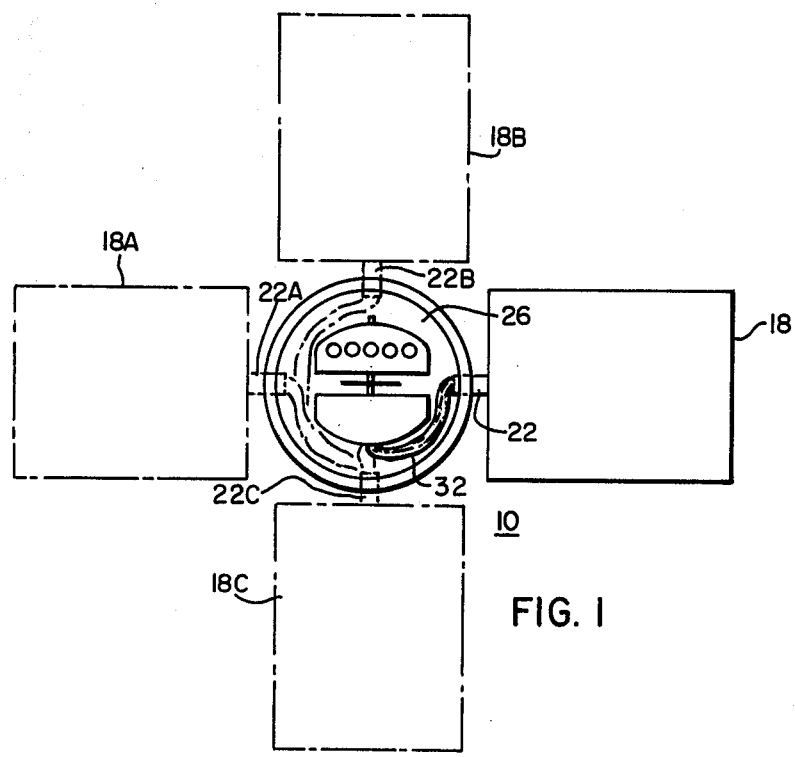
FIG. 1 is a schematic view of a remote meter reading package including a watthour meter enclosure having a cover made in accordance with the present invention and shown in different operative positions.
Figure 2:
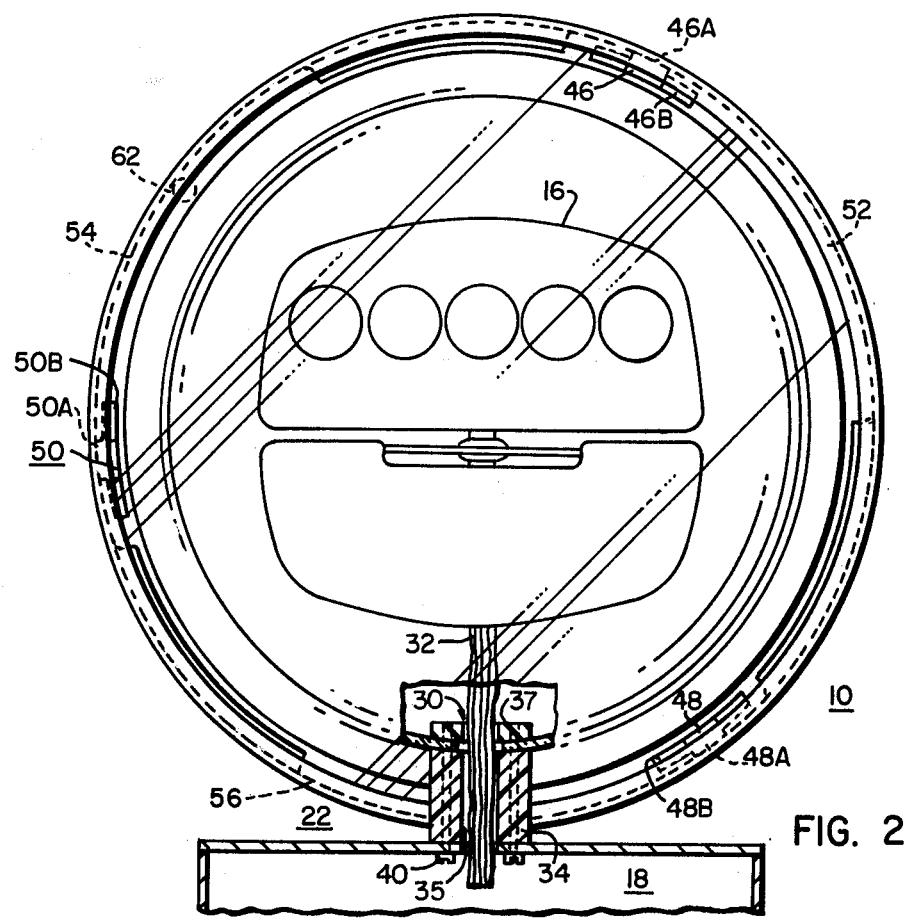
FIG. 2 is a front elevational view with parts broken away of the watthour meter shown in FIG. 1.
Figure 3:
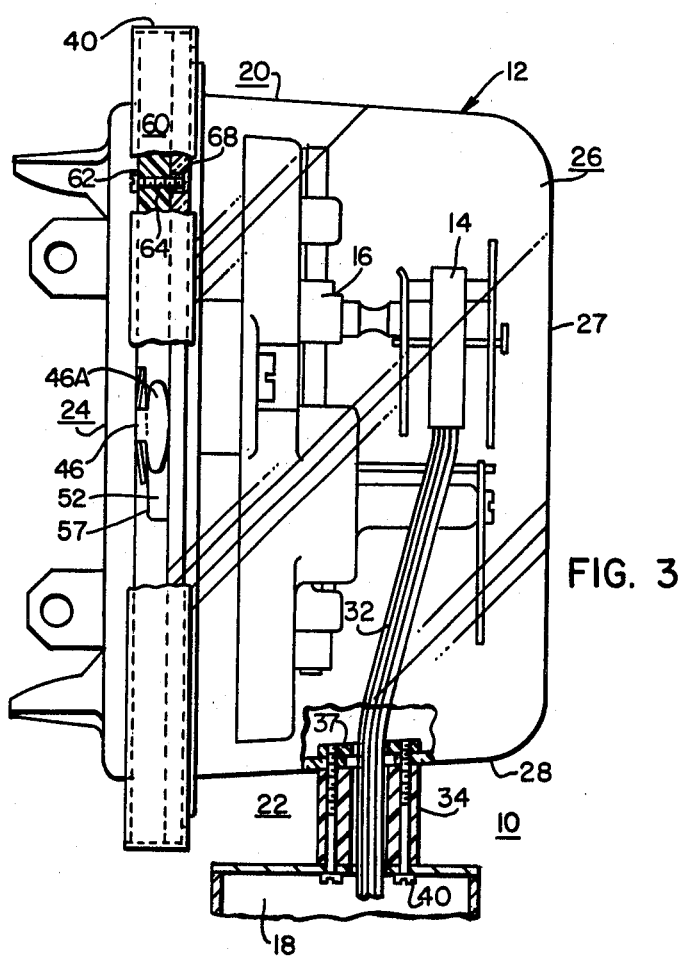
FIG. 3 is a side elevational view with parts broken away of the watthour meter shown in FIG. 2.

Referring now to the drawings, and more particularly to FIGS. 1, 2 and 3, there is shown a remote meter reading package 10. The package 10 includes a watthour meter 12 of the well known rotating disc integrating type equipped with a meter data sending unit 14 shown in FIG. 3. The meter data sending unit is responsive to the meter's electromagnetic metering movement 16. The package 10 further includes a remote meter reading terminal unit 18 connected to the meter enclosure 20 at a coupling assembly 22 provided in accordance with this invention.

Figure 4:
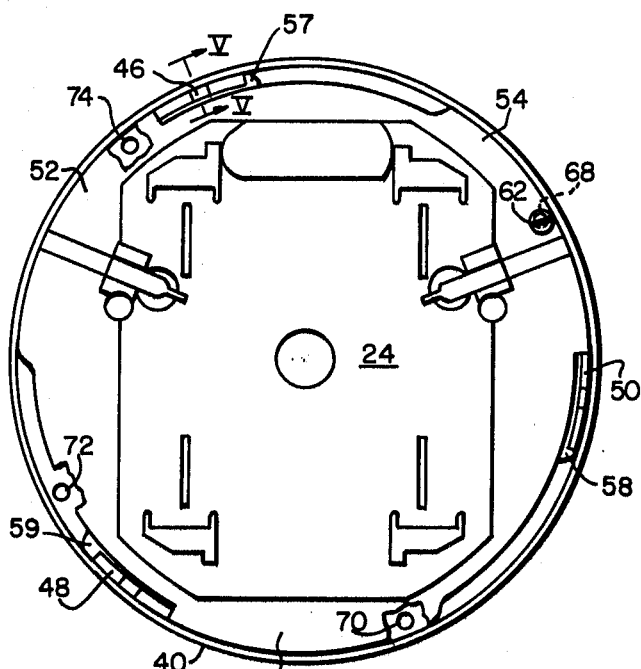
FIG. 4 is a rear elevational view with parts broken away of the watthour meter shown in FIG. 2.

The meter enclosure 20 includes a base assembly 24, the back of which is shown in FIG. 4. The enclosure also includes a cover 26. The metering movement 16 is supported in a forward projecting manner by the base 24. A cup-shaped cover 26, made in accordance with this invention, has a bottom or closed forward end 27, a circular side 28, and a rear open end 29 which is attached to the base 24 to enclose and protect the metering movement 16. In a manner described further hereinbelow, the cover 26 is rotatably positionable on the base 24 to orient the coupling assembly 22 and the remote meter reading terminal 18 at a predetermined rotated position. In FIG. 1, the solid line positions of the coupling assembly 22 and the terminal unit 18 extend to the right. The alternate operative positions indicated by the broken lines 22A, 22B and 22C and 18A, 18B and 18C of the coupling assembly 22 and the terminal unit 18 are shown extending below, to the left and above, respectively, from the meter 12.

Figure 8:
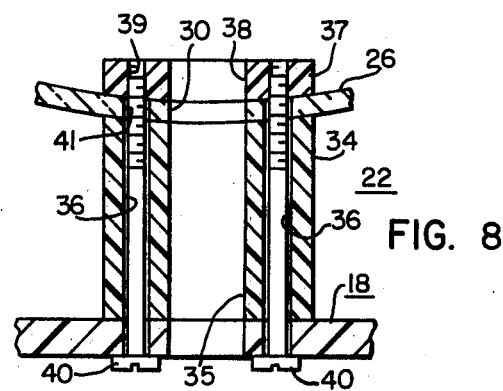
FIG. 8 is a cross-sectional view taken along the axis VIII—VIII in FIG. 7 and looking in the direction of the arrows.

The cup-shaped cover 26 is preferably made of an unbreakable plastic and has a general construction and size as described and claimed in U.S. Pat. No. 3,846,677, issued Nov. 5, 1974, and assigned to the assignee of this invention, incorporated herein by reference, except for the changes therein to provide the present invention. A side opening 30 is provided in the circular extending side 28 of the cover 26 and the opening 30 is shown oriented in the bottom vertical position in FIGS. 2 and 3. The coupling assembly 22 is shown in an enlarged sectional view of FIG. 8 assembled in the opening 30 to interconnect the cover and the terminal unit 18 and it forms a protected passage for wire conductors 32. The coupling assembly 22 includes a conduit part 34 extending from the opening 30 and is preferably formed by a hollow plastic block having a passage 35 and screw receiving holes 36. A plastic annular plate 37 has center hole 38 and threaded holes 39 for receiving the screw fasteners 40 to clamp the assembly 22 to a portion of a cover surrounding the opening 30. The screws 40 are applied from inside the housing of the unit 18 through holes therein that are aligned with the conduit holes 36, small holes 41 in the cover adjacent the hole 35, and are threaded into the plate 37 at the holes 39. It is contemplated that male and female plug connectors may be mounted at the opening 30 for detachably connecting the wires 32 interconnecting the terminal unit 18 and the meter 12. As thus described, an integral remote meter reading package 10 is formed by the coupling assembly 22 interconnecting the meter cover 26 and the terminal unit 18.

The wire conductors 32 pass through the plate 37 and conduit 34 to electrically connect the meter data sending unit 14 to the terminal unit 18. The meter data sending unit can be a meter register encoder of the type disclosed in U.S. Pat. No. 4,037,219 and assigned to the assignee of this invention, now patent U.S. 4,037,219. The aforementioned encoder produces an electronic binary signal responsive to each dial pointer position of a watthour meter register. The terminal unit 18 may be of a type for transmission of a meter encoded signal to a central location. Such terminal units modulate a carrier signal with the meter data intelligence for transmission over a suitable communications link, such as telephone, radio or distribution line carrier systems. Alternatively, the terminal unit 18 can be a load research type device including a recorder such as disclosed in the aforementioned U.S. Pat. No. 4,063,661 for an electric load research device, and assigned to the assignee of this invention. When the terminal unit 18 includes a recorder, as described in the aforementioned patent, the meter data sending unit 14 includes a pulse initiator for producing pulses in response to predetermined increments of watthour meter disc rotation as disclosed in U.S. Pat. Nos. 3,733,493 and 3,943,498. Electrical signals from the meter data sending unit, either in the form of encoded register readings or pulses of a pulse initiator, are transmitted through the wire conductors 32 to the terminal unit 18, as noted hereinabove.

Figure 5:
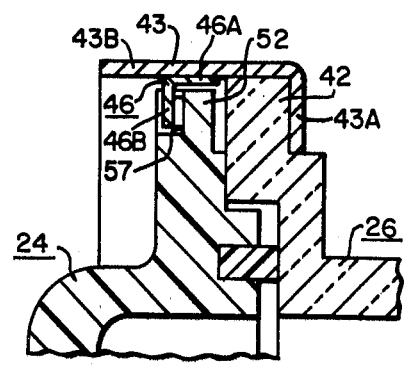
FIG. 5 is a fragmentary cross-sectional view taken along the axis V—V of FIG. 4 and looking in the direction of the arrows.

In accordance with the present invention, the cover 26 is detachably mountable to the meter base 24 in different predetermined rotated positions as shown in FIG. 1. The cover 26 has the same general configuration as described in the U.S. Pat. No. 3,846,677 as noted hereinabove. A metal locking rim 43, similar to the one described in the aforementioned patent including a forward lip portion 43A and a cylindrical body 43B, shown in FIG. 5, is carried on a radial mounting flange 42 of the cover 26. Attached to the inner wall of the rearwardly extending cylindrical body 43B of the locking rim 43 there are three locking tabs 46, 48 and 50 having an L-shaped cross-section as shown for the tab 46 in FIGS. 5 and 6. The back portions 46A, 48A and 50A are spot welded to the metal locking rim as are the corresponding bottom portions of the locking tabs in the aforementioned patent. The locking tabs 46, 48 and 50 further include resilient wing projections 46B, 48B, and 50B projecting at substantially right angles to the back portions thereof, as shown in the exemplary locking tab 48 in FIG. 6. The ends of the wing projections 46B, 48B and 50B extend toward, in spaced relationship, the rear radial surface of the cover mounting flange 42. Thus, the rim 40 is freely rotatable around the rear of the cover 26 when it is separated from the meter base.

Figure 6:
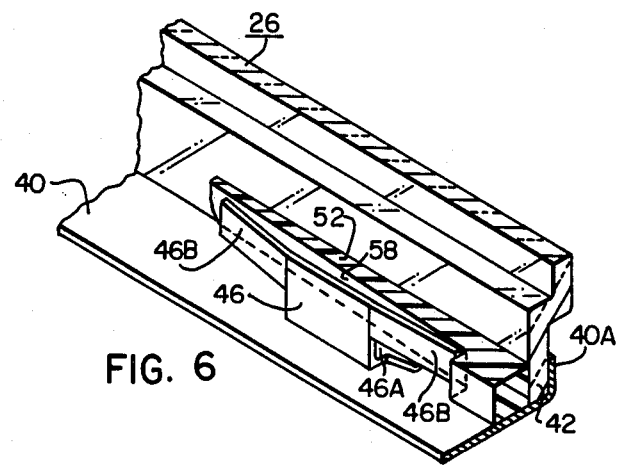
FIG. 6 is a fragmentary isometric view with parts broken away of the rear area of the watthour meter showing the mounting of the cover on the meter base.
Figure 7:
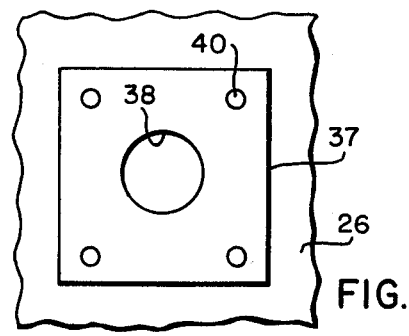
FIG. 7 is an enlarged view of the broken away portion of FIG. 2 illustrating a coupling assembly mounted to the cover.

The wing projections and receivable in the three camming grooves 57, 58 and 59 provided on the back of three arcuate attachment lugs 52, 54 and 56 shown in FIG. 4. The camming groove 57 of the attachment lug 52 is shown in FIG. 6 receiving the wing projections 46B of the locking tab 46. As shown in FIGS. 3, 5 and 6 (showing the exemplary locking tab 46) the wing projections 46B, 48B and 50B axially clamp the radial mounting flange 42 of the cover between the forward annular lip portion 43A of the locking rim 43 and the three arcuate attachment lugs 52, 54 and 56. The cover 26 while being held to the base 24 is rotatable since the cover mounting flange 42 is slidable between the lip 43A of the locking rim 40 and the forward radial surfaces of the arcuate lugs 52, 54 and 56. Thus, the cover 26 is rotatable to position the coupling assembly 22 associated with the cover opening 30 to a predetermined rotated position.

In mounting the cover 26 to the base 24, the locking tabs 46, 48 and 50 of the locking rim 43 are aligned in the spaces between the arcuate attachment lugs 52, 54 and 56 so that the wing projections extend beyond the back of the base attachment lugs. The locking rim 43 is rotated so that the wing projections 46B, 48B and 50B are seated in the rear camming surfaces 57, 58 and 59 of the attachment lugs 52, 54 and 56. The cover 26 is consequently attached to the base so as to be freely rotatable to a predetermined position.

A rotational locking arrangement 60, shown in the upper left-hand broken away section of FIG. 3 and also in FIG. 4, includes a screw fastener 62 threadably mounted in a threaded aperture or through-hole 64 in the base 24. The screw further extends into a recessed hole 68 extending into the rear surface of the cover mounting flange 42. Three additional recessed holes 70, 72 and 74 shown in FIG. 4 are provided in a circularly disposed relationship with the hole 68 in the rear surface of the cover mounting flange 42 so that the four holes 68, 70, 72 and 74 are displaced ninety arcuate degrees apart. The recessed holes are circular and have a diameter slightly larger than that of the shank of the screw 62 to receive the screw end. Extension of the screw into one of the recesses 68, 70, 72 or 74 prevents rotation of the cover and rotationally locks the cover in place on the meter base. The position of the recessed holes is such that the screw 62 will be received by an associated hole when the cover opening 30 is oriented at the top or bottom or at either the left or right side to establish the desired orientation of the coupling assembly 22 and the terminal unit 18. The screw 62 maintains a predetermined package orientation by locking the base and the cover together to prevent rotation therebetween.

The remote meter reading package 10 including the cover 26 and coupling assembly 22 provides a convenient arrangement for orienting and mounting of the associated terminal unit 18 adjacent the mounting position of the meter 10 at a meter socket.

In one mode of assembly, the plate 37 has its hole 38 aligned with the cover opening 30 and the conductors 32 are placed through them. The plate 37 may be permanently secured in place within the cover 26 by a suitable adhesive at an earlier time. The conduit part 34 is positioned adjacently between the cover opening 30 and the terminal unit 18 and the conductors 32 are passed through the conduit passage 35 to the terminal unit 18. The screws 40 are inserted from inside the terminal unit and pass through the screw holes of the terminal unit, of the conduit and of the cover. The screws 40 are then threaded into the plate holes 39 so that the coupling assembly 22 clamps the cover 26 and terminal unit 18 into an integral arrangement. When the meter base 24 carrying the metering unit equipped with the sending unit 14 receives the cover 26, the package 10 will be completely assembled for operation.

Upon establishing the orientation for mounting the package 10, for example with the terminal unit 18 extending to the right as shown in FIG. 1, the cover with the coupling assembly 22 and terminal unit 18 attached is placed on the meter base 24 as described hereinabove. The cover 26 is rotated so that the coupling assembly 22 and the terminal unit 18 extend to the right. The hole 64, at the back of the base and containing the screw 62 in a retracted position, is aligned with the cover hole 68 and the screw is then threaded to extend into the hole 68. This rotationally locks the cover 26 to the base 24 so that the meter 12 is in a proper condition to be inserted into the associated meter socket defining the meter mounting location. Upon attaching the meter 12 to the meter socket, the remote meter reading package 10 is properly positioned with the terminal unit 18 being attached to the meter cover 26 through the coupling assembly 22.

Various rotated and locked positions of the cover relative to the meter base 24 can be provided by using selected or additional ones of the holes 68, 70, 72 and 74 or displacing the aforementioned holes to provide the desired rotated orientation of the cover opening and coupling assembly. It is contemplated that other changes and modifications of this invention may be made without departing from the spirit and scope of the invention.

What is claimed is:

1. A watthour meter enclosure comprising:

a cup-shaped cover including a closed forward end, a side portion extending to an open end, a side portion including an opening, and a circular mounting flange extending radially outward at said open end along front and rear radial surfaces;

a circular locking rim having a forward portion overlapping said front radial surface of the cover flange and an integral cylindrical body extending rearward from said front portion so that the inner wall of said cylindrical body extends over and beyond the outer periphery of the cover flange, said locking rim including a plurality of locking tab members carried on said inner wall of said cylindrical body and extending from said inner wall in separately spaced relationships from each other and from the cover flange so that the cover flange is freely rotatable within said locking rim;

a base assembly supporting a watthour meter movement and a meter data sending unit responsive to said movement, said sending unit including plural conductors intended for connection externally of said cover, said base assembly including plural arcuate attachment lugs extending radially at the outer periphery thereof in a spaced apart relationship, said attachment lugs having forward and rear radial surfaces thereon, said attachment lugs rotationally receiving said plurality of locking tabs in engagement with the rear radial surfaces thereof and attaching said cover to said base assembly so as to be rotatable to a predetermined position relative to said locking rim and said base assembly, the side opening of said cover having a desired arcuate position and receiving said plural conductors with said cover being at said predetermined position; and a rotational locking arrangement including at least one recess extending into said rear radial surface of the cover flange at a predetermined arcuate position relative to the side opening, a hole in said base assembly aligned with said recess in said cover flange with said cover opening being in said desired arcuate position, and fastener means extending within both the aligned hole and recess to retain said cover in the predetermined rotated position thereof.

2. The watthour meter enclosure as claimed in claim 1 wherein either one of said hole of said base assembly or said recess of said cover includes a threaded portion and said fastener means includes a screw threadably received by the threaded portion.

3. The watthour meter enclosure as claimed in claim 1 wherein said cup-shaped cover includes a coupling assembly mounted over said opening, said coupling assembly including a conduit part extending from said cover for receiving and directing said plurality of conductors away from said cover.

4. The watthour meter enclosure as claimed in claim 3 wherein said coupling assembly includes an annular plate positioned inside the cover around the cover side opening, said plate, said conduit part, and said cover side portion include mutually aligned holes, and wherein the coupling assembly further includes screw fasteners mounted in said mutually aligned holes for clamping said coupling assembly to said meter cover.

5. The watthour meter enclosure as claimed in claim 1 wherein said locking tab members have an L-shaped cross-sectional configuration with one portion thereof attached to said locking rim so that a second resilient portion thereof extends behind the meter base and resiliently engages said rear radial sides of said attachment lugs.

6. The watthour meter enclosure as claimed in claim 5 wherein said cover includes a plurality of recesses disposed in a circular relationship with respect to each other and said first named recess so that each recess is alignable with said hole in said meter base for receiving said fastener means when said cover is in alternate rotated positions relative to said base assembly.

* * * * *